US012806933B2

(12) United States Patent
Mayrhofer

(10) Patent No.: US 12,806,933 B2
(45) Date of Patent: Nov. 24, 2026

(54) METHOD FOR PRODUCING POLYMER VALUE PAPERS OR POLYMER SECURITY PAPERS

(71) Applicant: Hueck Folien Gesellschaft M.B.H., Baumgartenberg (AT)

(72) Inventor: Marco Mayrhofer, Baumgartenberg (AT)

(73) Assignee: Hueck Folien Gesellschaft M.B.H., Baumgartenberg (AT)

( * ) Notice: Subject to any disclaimer, the term of this patent is extended or adjusted under 35 U.S.C. 154(b) by 440 days.

(21) Appl. No.: 18/028,974

(22) PCT Filed: Sep. 28, 2021

(86) PCT No.: PCT/EP2021/076681
§ 371 (c)(1),
(2) Date: Mar. 28, 2023

(87) PCT Pub. No.: WO2022/069485
PCT Pub. Date: Apr. 7, 2022

(65) Prior Publication Data

US 2023/0331023 A1 Oct. 19, 2023

(30) Foreign Application Priority Data

Sep. 29, 2020 (EP) .................................... 20198895

(51) Int. Cl.
*B42D 25/36* (2014.01)
*B42D 25/351* (2014.01)
*B42D 25/47* (2014.01)

(52) U.S. Cl.
CPC ........... *B42D 25/36* (2014.10); *B42D 25/351* (2014.10); *B42D 25/47* (2014.10)

(58) Field of Classification Search
USPC .......................................................... 162/140
See application file for complete search history.

(56) References Cited

U.S. PATENT DOCUMENTS 5,438,928 A 8/1995 Chatwin
5,665,194 A 9/1997 Kay
(Continued)

FOREIGN PATENT DOCUMENTS

CA 2745913 A1 7/2010
CN 102245394 A 11/2011
(Continued)

OTHER PUBLICATIONS

Translation of WO 2018/224159 (Year: 2019).*
International Search Report dated Dec. 3., 2021 for copending Int. App. No. PCT/EP2021/076681 (w_English_translation).

*Primary Examiner* — Jacob T Minskey
(74) *Attorney, Agent, or Firm* — FisherBroyles, LLP; Douglas P. LaLone

(57) ABSTRACT

A method for producing polymer papers of value or polymer security papers is described. The method may include providing a polymer substrate of at least one polymer. The polymer substrate may have a first substrate side and a second substrate side. The method may also include providing a security element that includes a transfer film. The transfer film may include at least one security feature and a detachable carrier film. The method may further include applying the transfer film at least one of onto the first substrate side and onto the second substrate side, connecting the at least one security feature to at least one of the first substrate side and the second substrate side, and removing the detachable carrier film.

18 Claims, 2 Drawing Sheets

(56) References Cited

U.S. PATENT DOCUMENTS

| | | | |
|---|---|---|---|
| 9,321,294 | B2 | 4/2016 | Scheuer |
| 10,427,446 | B2 | 10/2019 | Staub et al. |
| 10,518,568 | B2 | 12/2019 | Staub et al. |
| 2003/0164611 | A1 | 9/2003 | Schneider et al. |
| 2019/0010364 | A1 | 1/2019 | Hähnel et al. |

FOREIGN PATENT DOCUMENTS

| | | | |
|---|---|---|---|
| CN | 104169098 | A | 11/2014 |
| CN | 107073993 | A | 8/2017 |
| CN | 107074001 | A | 8/2017 |
| DE | 202012010037 | U1 | 1/2014 |
| RU | 2265524 | C2 | 12/2005 |
| RU | 146146 | U1 | 10/2014 |
| WO | 9315914 | A1 | 8/1993 |
| WO | 2019224159 | A1 | 11/2019 |

* cited by examiner

METHOD FOR PRODUCING POLYMER VALUE PAPERS OR POLYMER SECURITY PAPERS

CROSS-REFERENCE TO RELATED APPLICATIONS

This application claims priority to International Patent Application No. PCT/EP2021/076681, filed on Sep. 28, 2021, and European Patent Application No. EP20198895.3, filed on Sep. 29, 2020, the contents of both of which are hereby incorporated by reference in their entirety.

TECHNICAL FIELD

The disclosure relates to a method for producing polymer papers of value or polymer security papers with a security feature and a polymer paper of value or polymer security paper produced according to this method.

Moreover, the disclosure relates to a security element, in particular for use in a method according to the claim(s), and/or for producing the polymer paper of value according to the claim(s), comprising a transfer film, which transfer film has at least one security feature and a detachable carrier film.

BACKGROUND

Polymer papers of value or polymer security papers of the initially mentioned type are usually used to increase protection against forgery of papers of value or security papers, such as banknotes, identification cards, credit cards, debit cards, tickets.

According to the prior art, it is technically impossible to apply a security feature in the form of a security thread in polymer papers of value or polymer security papers. In particular, it is impossible, in the case of polymer papers of value and polymer security papers, to introduce a customary and/or conventional security thread directly into the polymer, as it is currently standard in papers of value or security papers made of paper or fibers.

In order to provide a remedy for this shortcoming, security threads in polymer papers of value or polymer security papers are merely imitated by printing measures. Security threads printed on this way, however, are not of satisfactory quality compared to the security threads known in papers of value or security papers made of paper or fibers and may thus not ensure a sufficiently high protection against forgery for a user.

OVERVIEW

It was the object of the present disclosure to overcome the shortcomings of the prior art and to provide a device and a method, by means of which a user is capable of producing polymer papers of value or polymer security papers with one or multiple highly forgery-proof security features.

This object is achieved by means of a device and a method according to the claim(s).

The disclosure relates to a method for producing polymer papers of value or polymer security papers with at least one security feature, comprising a polymer substrate of at least one polymer.

In this, the following method steps are provided:

providing a polymer substrate of at least one polymer with a first substrate side and a second substrate side, providing a security element comprising a transfer film, which transfer film comprises at least one security feature and a detachable carrier film, applying the transfer film onto the first substrate side and/or onto the second substrate side, at least in some sections, connecting the at least one security feature to the first substrate side and/or the second substrate side, removing the detachable carrier film.

This method creates the possibility of producing the polymer papers of value or polymer security papers with one or multiple highly forgery-proof security features. The security element according to the disclosure, which comprises a transfer film, has the advantage that thereby, the entire portfolio of security features known according to the prior art, which is also employed for conventional security threads, can be applied. By means of the application of the transfer film at least in some sections, security features can be applied onto the polymer substrate in the required numbers and sizes. Connecting the security feature or the security features to the polymer substrate leads to their permanent transfer onto the polymer substrate. After the connection is completed, the detachable carrier film can be removed and/or pulled of easily and effortlessly, so that the security feature or the security features permanently remain on the polymer substrate.

Polymer papers of value or polymer security papers are currently often used particularly for low denominations. Usually, no expensive security features, for example in the form of hologram strips, are applied on these banknotes—for cost reasons, among other factors. The method according to the disclosure enables a user to apply the security element and/or the transfer film directly during the production of the polymer substrate, which has, inter alia, a positive effect on the production costs, as well. Consequently, with this innovative method, polymer papers of value or polymer security papers can now also be provided with one or multiple high-quality and highly forgery-proof security features. The low thickness of the polymer banknote achievable by this method entails a great advantage. This low thickness proves advantageous particularly for stacking, but also already while printing.

Furthermore, it may be useful if the detachable carrier film is made from plastic, in particular a translucent plastic, wherein the detachable carrier film preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or is made of at least one of these materials.

Moreover, it may be provided that, for connecting the security feature to the polymer substrate, thermal energy and/or pressure is applied. Application and/or bonding technologies with exposure to pressure and/or to thermal energy may make a permanent connection between individual layers of a film and/or to a polymer substrate possible.

Furthermore, it may be provided that the detachable carrier film has a thickness of between 6 μm and 100 μm, preferably 8 μm and 50 μm, particularly preferably 10 μm and 36 μm, in particular 12 μm and 23 μm. These layer thicknesses may have an advantageous effect on the stability of the transfer film and thus facilitate their handling. Moreover, these layer thicknesses facilitate the detachability of the carrier film from the polymer substrate. A simple and effortless detachability of the detachable carrier film may positively influence the efficiency of the method.

An embodiment, according to which it may be provided that a separating layer is arranged between the detachable carrier film and the security feature, which separating layer is designed to facilitate the removal of the detachable carrier film, is also advantageous. Thus, it can be ensured that the carrier film can be detached completely and in one piece. A simple and effortless detachability of the detachable carrier film may positively influence the efficiency of the method.

According to an advancement, it is possible that the separating layer is formed by a separating lacquer.

Furthermore, it may be useful if the transfer film is bounded, on its outer side, by the detachable carrier film, and if the transfer film is bounded, on its inner side, by a connecting layer, which connecting layer is arranged to facilitate the connection between the security feature and the polymer substrate. By means of this advancement, an improved connection between the individual layers of the transfer film can be effected, and, in particular, the connection of the security feature to the polymer substrate can be facilitated and/or improved.

Moreover, it may be provided that the connecting layer is formed by a heat-sealing lacquer or an adhesive.

Furthermore, it may be provided that an adhesion promoter layer is formed between the security feature and the connecting layer, which adhesion promoter layer is arranged to facilitate the connection between the security feature and the connecting layer. By means of this advancement, an improved connection between the individual layers of the transfer film can be effected, and, in particular, the connection of the security feature to the polymer substrate can be facilitated and/or improved. This measure may have a positive effect particularly on the durability of the polymer paper of value or the polymer security paper.

According to a particular embodiment, it is possible that the security feature is formed by an embossed layer, a partially metallized layer, a fluorescent layer, a printed layer, a magnetic encoding and/or an optically variable feature, in particular by a hologram and/or a color-shifting coating, for example a coating having at least one color-shifting thin-layer element. This embodiment has the advantage that a user can select from a large portfolio and a plurality of possible combinations of security features. Thereby, a high degree of protection against forgery can be realized.

According to an advantageous advancement, it may be provided that the polymer substrate is cut after the application, at least in some sections, of the transfer film. This process-related measure can influence the efficiency of the method positively.

In particular, it may be advantageous if the transfer film is applied onto the polymer substrate with a width of 0.5-30 mm, preferably 0.8-20 mm, particularly preferably 1-15 mm, in particular 1.5-10 mm Advantageously, the transfer film has a narrow width compared to the polymer substrate since thereby, the shape of a security thread can be realized.

Furthermore, a polymer paper of value or polymer security paper having at least one security feature, comprising a polymer substrate of at least one polymer can be provided. The polymer paper of value or the polymer security paper is produced in a method according to one of claims 1 to 12.

With the polymer paper of value or polymer security paper according to the disclosure, a user is provided with polymer papers of value or polymer security papers with a highly forgery-proof security feature. With the security element according to the disclosure, which security element comprises a transfer film, the entire known portfolio of security features used in conventional security threads can be used. Due to the transfer film applied at least in some sections, security features can be employed in the required numbers and sizes. The security feature(s) are, in this regard, advantageously connected permanently to the polymer substrate. After the connection is completed, the detachable carrier film can be removed and/or pulled of easily and effortlessly, so that the security feature or the security features remain on the polymer substrate.

Polymer papers of value or polymer security papers are often used particularly for low denominations. Usually, no expensive security features, for example in the form of hologram strips, are applied on these banknotes—for cost reasons, among other factors. With the polymer paper of value or polymer security paper according to the disclosure, a user is provided a paper of value or security paper, which is equipped with one or multiple high-quality and highly forgery-proof security features. The low thickness of the polymer paper of value or polymer security paper according to the disclosure, in particular of the polymer banknote, entails a great advantage. This low thickness proves advantageous particularly for stacking, but also already while printing.

The object mentioned above may also be achieved, according to the disclosure with a security element of the initially mentioned type in that the transfer film is bounded, on its outer side, by the detachable carrier film, and that the transfer film is bounded, on its inner side, by a connecting layer, in particular in the form of a heat-sealing lacquer, for connecting to the polymer substrate.

For the purpose of better understanding of the disclosure, it will be elucidated in more detail by means of the figures below.

BRIEF DESCRIPTION OF THE DRAWINGS

These show in a respectively very simplified schematic representation.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
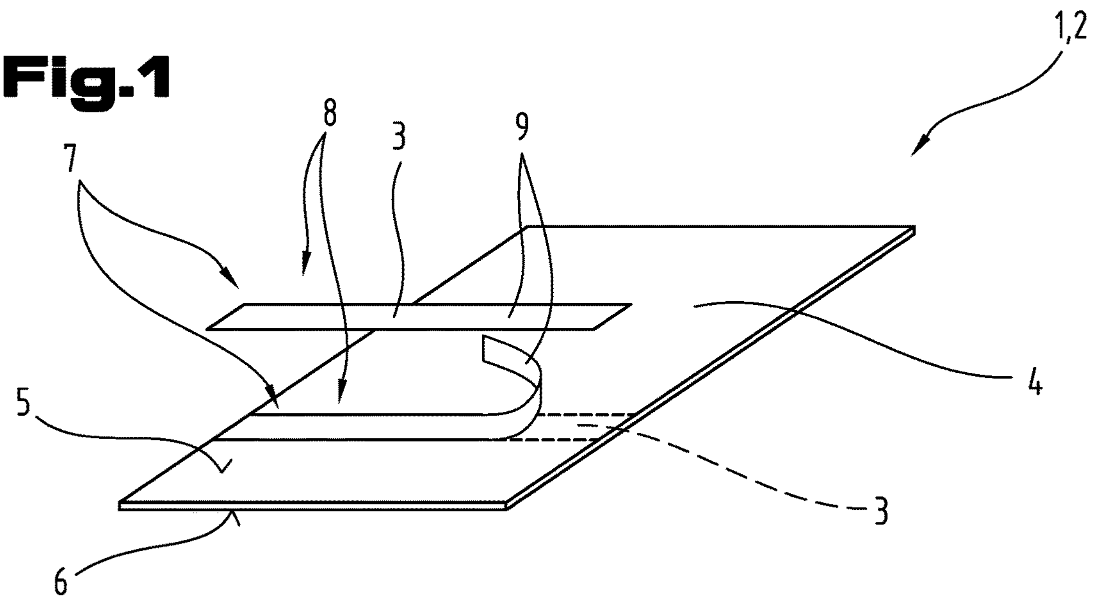
FIG. 1 shows a first embodiment of a polymer paper of value or a polymer security paper in an exploded view.

FIG. 1 shows a first embodiment of a polymer paper of value 1 or a polymer security paper 2 with a security feature 3 in an exploded view. FIG. 1 shows multiple steps of the production method simultaneously. The polymer paper of value 1 or the polymer security paper 2 comprises a polymer substrate 4. This polymer substrate has a first substrate side 5 and a second substrate side 6. In the production method of this polymer paper of value 1 or polymer security paper 2, the security feature 3 is initially on and/or in a security element 7. This security element 7 comprises a transfer film 8, wherein the transfer film 8 also comprises a detachable carrier film 9 in addition to the security feature 3. The security element 7 and/or the transfer film 8 are shown twice in FIG. 1, in order to illustrate the production method more clearly. In one case, the security element 7 and/or the transfer film 8 is shown separated from the polymer substrate 4. Additionally, the security element 7 and/or the transfer film 8 is shown connected to the polymer substrate 4.

In the exemplary embodiment shown, the transfer film 8 has a narrow strip shape—compared to the polymer paper of value 1 and/or to the polymer security paper 2. However, of course, the transfer film 8 may also have other shapes and/or sizes and may also be used in different numbers. The transfer film 8 is applied, at least in some sections, onto the first substrate side 5 during the production method of the polymer paper of value 1 or the polymer security paper 2. However, it is also conceivable and useful if the transfer film 8 is applied onto the second substrate side 6 or also is applied onto both substrate sides 5, 6. In further consequence, the security feature 3 is connected to the first substrate side 5, as shown, and the detachable carrier film 9 is removed. Hence, the security feature 3—illustrated by means of dashed lines—remains on the polymer paper of value 1 and/or on the polymer security paper 2 permanently.

In this regard, it is possible that the detachable carrier film 9 is made from plastic, in particular a translucent plastic, wherein the detachable carrier film 9 preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or is made of at least one of these materials.

For connecting the security feature 3 to the polymer substrate 4, advantageously, thermal energy and/or pressure may be applied. In the method for producing the polymer paper of value 1 or the polymer security paper 2, it may be advantageous if the detachable carrier film 9 has a thickness of between 6 μm and 100 μm, preferably 8 μm and 50 μm, particularly preferably 10 μm and 36 μm, in particular 12 μm and 23 μm. The security feature 3 may be formed by an embossed layer, a partially metallized layer, a fluorescent layer, a printed layer, a magnetic encoding and/or an optically variable feature, in particular by a hologram and/or a color-shifting coating, for example a coating having at least one color-shifting thin-layer element. It may also be useful if the polymer substrate 4 is cut after the application of the transfer film 8. The transfer film 8 may be applied onto the polymer substrate 4 with a width of 0.5-30 mm, preferably 0.8-20 mm, particularly preferably 1-15 mm, in particular 1.5-10 mm.

FIGS. 2 to 5 show two further and optionally independent embodiments of the polymer paper of value 1 and/or polymer security paper 2, wherein equal reference numbers and/or component designations are used for equal parts as before in FIG. 1. In order to avoid unnecessary repetitions, it is therefore pointed to/reference is made thus to the detailed description in FIG. 1 preceding it.

Figure 2:
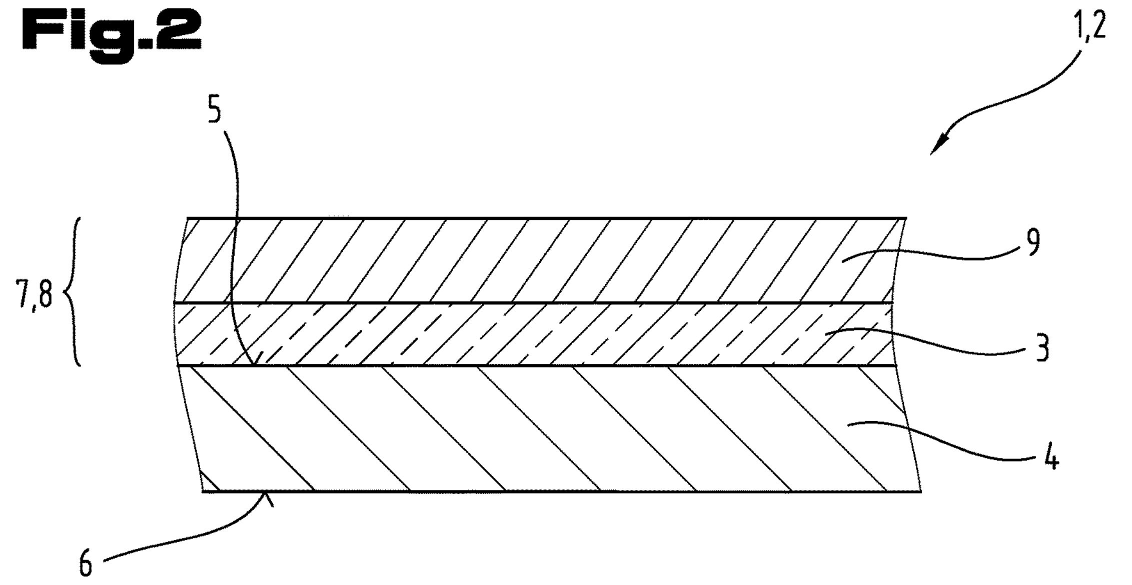
FIG. 2 shows a second embodiment of a polymer paper of value or a polymer security paper in cross-section with a detachable carrier film.

FIG. 2 shows a second embodiment of a polymer paper of value 1 or a polymer security paper 2 in cross-section with a detachable carrier film 9.

The polymer paper of value 1 or the polymer security paper 2 comprises a polymer substrate 4. This polymer substrate has a first substrate side 5 and a second substrate side 6. In the production method of this polymer paper of value 1 or polymer security paper 2, the security feature 3 is initially on and/or in a security element 7. This security element 7 comprises a transfer film 8, wherein the transfer film 8 also comprises a detachable carrier film 9 in addition to the security feature 3. The transfer film 8 is applied, at least in some sections, onto the first substrate side 5 during the production method of the polymer paper of value 1 or the polymer security paper 2. However, it is also conceivable and useful if the transfer film 8 is applied onto the second substrate side 6 or also is applied onto both substrate sides 5, 6. In this process, the transfer film 8 is bounded, on its outer side, that is on its side facing away from the polymer substrate 4, by the detachable carrier film 9, and on its inner side, that is the side facing the polymer substrate 4, by the security feature 3. In further consequence, the security feature 3 is connected to the first substrate side 5 and furthermore, the detachable carrier film 9 is removed. Hence, the security feature 3 remains on the polymer paper of value 1 and/or on the polymer security paper 2 permanently.

Figure 3:
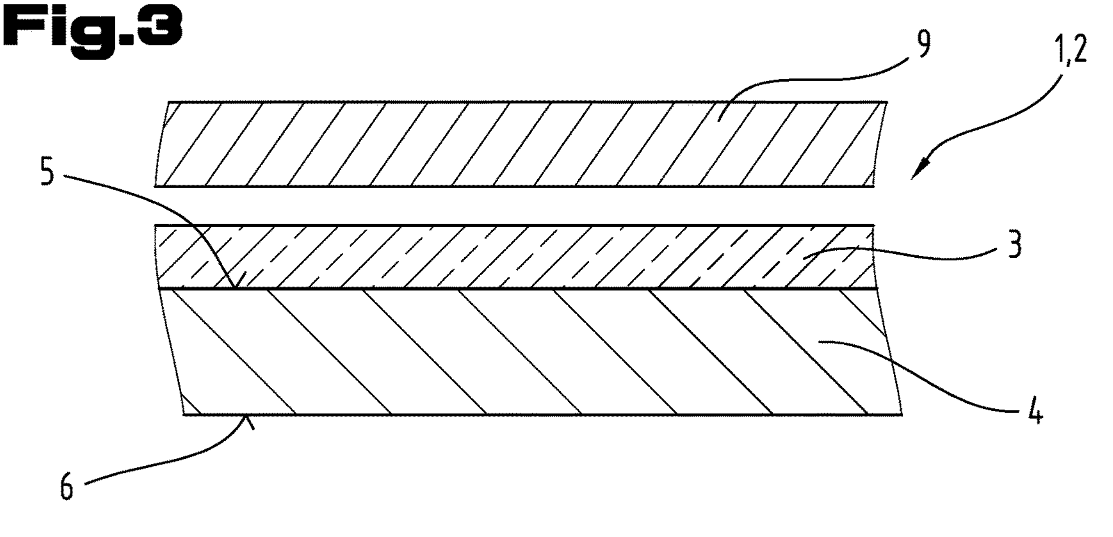
FIG. 3 shows a second embodiment of a polymer paper of value or a polymer security paper in cross-section after removing the detachable carrier film.

FIG. 3 shows the second embodiment of a polymer paper of value 1 or of a polymer security paper 2, also in cross-section, but after the detachable carrier film 9 has been removed, wherein the security feature 3 remains on the polymer substrate 4.

Figure 4:
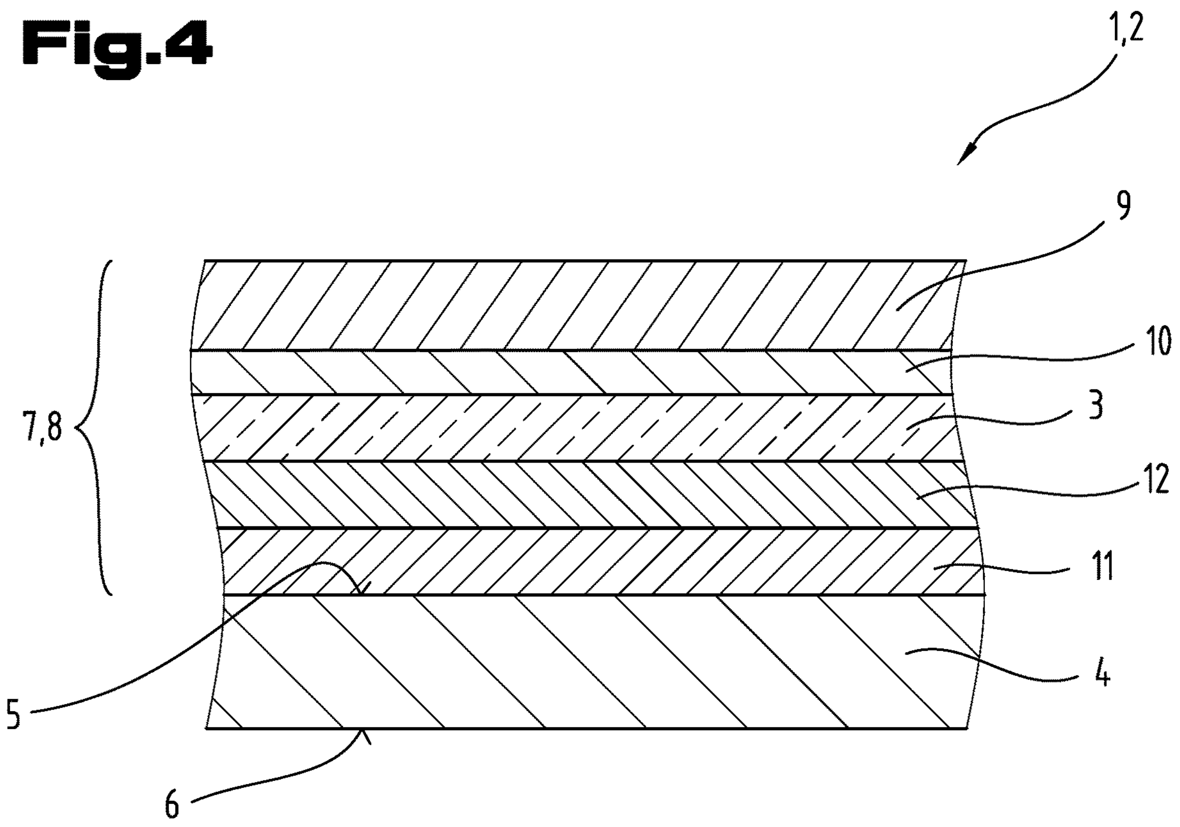
FIG. 4 shows a third embodiment of a polymer paper of value or a polymer security paper in a cross-section with a detachable carrier film.

FIG. 4 shows a third embodiment of a polymer paper of value 1 or a polymer security paper 2 in a cross-section with a detachable carrier film 9.

The polymer paper of value 1 or the polymer security paper 2 comprises a polymer substrate 4. This polymer substrate has a first substrate side 5 and a second substrate side 6. In the production method of this polymer paper of value 1 or polymer security paper 2, the security feature 3 is initially on and/or in a security element 7. This security element 7 comprises a transfer film 8, wherein the transfer film 8 also comprises a detachable 9 in addition to the security feature 3. The transfer film 8 is applied, at least in some sections, onto the first substrate side 5 during the production method of the polymer paper of value 1 or the polymer security paper 2. However, it is also conceivable and useful if the transfer film 8 is applied onto the second substrate side 6 or also is applied onto both substrate sides 5, 6. In this process, the transfer film 8 is bounded, on its outer side, that is on its side facing away from the polymer substrate 4, by the detachable carrier film 9, and on its inner side, that is the side facing the polymer substrate 4, by an optional connecting layer 11. In further consequence, the security feature 3 is connected to the first substrate side 5 and furthermore, the detachable carrier film 9 is removed. Hence, the security feature 3 remains on the polymer paper of value 1 and/or on the polymer security paper 2 permanently.

In addition to the method steps described in FIG. 1, it may be useful here if a separating layer 10 is arranged between the detachable carrier film 9 and the security feature 3, which separating layer 10 is designed to facilitate the removal of the detachable carrier film 9. The separating layer 10 may, in this regard, be formed by a separating lacquer. Furthermore, the transfer film 8 may be bounded, on its outer side, by the detachable carrier film 9, and on its inner side by the optional connecting layer 11, which is arranged to facilitate the connection of the security feature 3 to the polymer substrate 4. This connecting layer 11 may, for example, be formed by a heat-sealing lacquer or an adhesive. As shown in FIG. 4, it may also be advantageous if an adhesion promoter layer 12 is formed between the security feature 3 and the connecting layer 11, which adhesion promoter layer 12 is arranged to facilitate the connection between the security feature 3 and the connecting layer 11.

Figure 5:
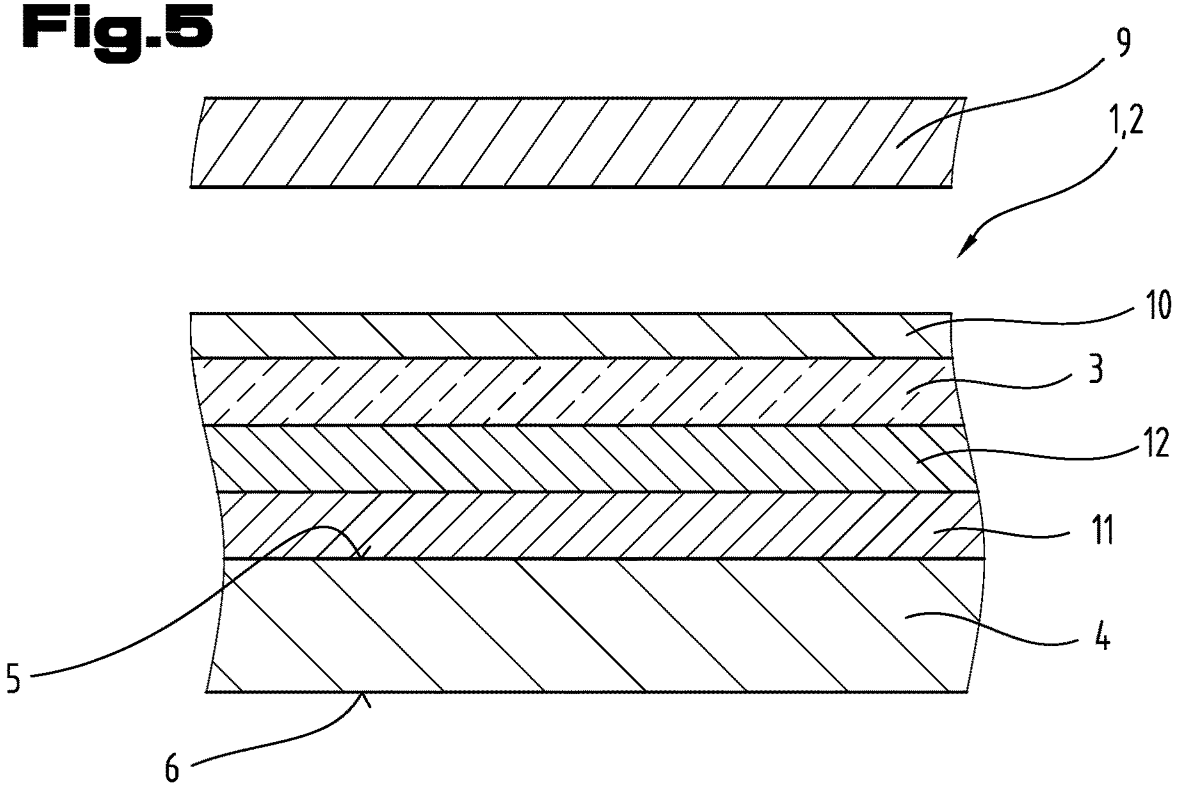
FIG. 5 shows a third embodiment of a polymer paper of value or a polymer security paper in a cross-section after removing the detachable carrier film.

FIG. 5 shows the third embodiment of a polymer paper of value 1 or of a polymer security paper 2, also in cross-section, but after the detachable carrier film 9 has been removed, wherein the security feature 3 remains on the polymer substrate 4. Additionally, the separating layer 10, the connecting layer 11, and the adhesion promoter layer 12 also remain on the polymer substrate 4 according to this third embodiment.

The separating layer 10, connecting layer 11, and adhesion promoter layer 12 as shown together in the third embodiment and/or FIGS. 4 and 5 are also conceivable independently of one another in further embodiments. These layers are thus not necessarily bound to the formation in a common embodiment. In particular, these layers may also be formed individually on a polymer paper of value 1 or a polymer security paper 2.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Polymer paper of value
2 Polymer security papers
3 Security feature
4 Polymer substrate
5 First substrate side
6 Second substrate side
7 Security element
8 Transfer film
9 Detachable carrier film
10 Separating layer
11 Connecting layer
12 Adhesion promoter layer

The invention claimed is:

1. A method for producing polymer banknote consisting of at least a substrate and a security element comprising:

providing the polymer substrate of at least one polymer, the polymer substrate having a first substrate side and a second substrate side;

providing the security element including a transfer film the transfer film including at least one security feature and a detachable carrier film, wherein the at least one security feature includes at least one of an embossed layer, a partially metallized layer, a fluorescent layer, a printed layer, a magnetic encoding, and an optically variable feature;

applying the transfer film at least one of onto the first substrate side and onto the second substrate side, at least in some sections;

connecting the at least one security feature to at least one of the first substrate side and the second substrate side; and removing the detachable carrier film so that the security feature permanently remains on the polymer substrate of the polymer banknote.

2. The method according to claim 1, wherein:

the detachable carrier film is composed of plastic; and the detachable carrier film comprises at least one of polyimide (PI), polypropylene (PP), monoaxially oriented polypropylene (MOPP), biaxially oriented polypropylene (BOPP), polyethylene (PE), polyphenylene sulfide (PPS), polyetheretherketone (PEEK), polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC), ethylene tetrafluoroethylene (ETFE), polytetrafluoroethylene (PTFE), polyvinyl fluoride (PVF), polyvinylidene fluoride (PVDF), ethylene-tetrafluoroethylene-hexafluoropropylene-fluoropolymer (EFEP), and mixtures and copolymers thereof.

3. The method according to claim 1, wherein connecting the at least one security feature to the polymer substrate includes applying at least one of thermal energy and pressure.

4. The method according to claim 1, wherein the detachable carrier film has a thickness of 6 μm to 100 μm.

5. The method according to claim 1, wherein:

the transfer film further includes a separating layer arranged between the detachable carrier film and the at least one security feature; and removing the detachable carrier film includes facilitating the removal of the detachable crulier film with the separating layer.

6. The method according to claim 5, wherein the separating layer is a separating lacquer.

7. The method according to claim 1, wherein:

the transfer film further includes a connecting layer;

an outer side of the transfer film is bounded by the detachable carrier film;

an inner side of the transfer film is bounded by the connecting layer; and connecting the at least one security feature to the polymer substrate includes facilitating connection of the at least one security feature and the polymer substrate with the connecting layer.

8. The method according to claim 7, wherein the connecting layer is one of a heat-sealing lacquer and an adhesive.

9. The method according to claim 7, wherein:

the transfer film further includes an adhesion promoter layer disposed between the at least one security feature and the connecting layer; and the adhesion promoter layer facilitates a connection between the at least one security feature and the connecting layer.

10. The method according to claim 1, further comprising cutting the polymer substrate after applying the transfer film.

11. The method according to claim 1, wherein the transfer film is applied onto the polymer substrate with a width of 0.5-30 mm.

12. The method according to claim 1, wherein:

an outer side of the transfer film is bounded, by the detachable carrier film; and an inner side of the transfer film is bounded by the connecting layer.

13. The method according to claim 12, wherein the connecting layer is a heat-sealing lacquer.

14. The method according to claim 1, wherein the at least one security feature includes a hologram.

15. The method according to claim 1, wherein the at least one security feature includes a color-shifting coating.

16. The method according to claim 15, wherein the color-shifting coating includes at least one color-shifting thin-layer element.

17. The method according to claim 1, wherein the detachable carrier film is composed of a translucent plastic and has a thickness of 12 μm to 23 μm.

18. The method according to claim 1, wherein:

an outer side of the transfer film is connected by the detachable carrier film; or an inner side of the transfer film is bounded, on its inner side, by the connecting layer.

* * * * *